United States Patent
Brodeur-Campbell et al.

(10) Patent No.: US 10,577,539 B2
(45) Date of Patent: Mar. 3, 2020

(54) PROCESS FOR PRODUCING FUELS FROM PYROLYSIS OIL

(71) Applicant: UOP LLC, Des Plaines, IL (US)

(72) Inventors: Michael J. Brodeur-Campbell, La Grange Park, IL (US); Travis C. Bowen, Crystal Lake, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/969,565

(22) Filed: May 2, 2018

(65) Prior Publication Data

US 2019/0338194 A1 Nov. 7, 2019

(51) Int. Cl.
*C10G 45/06* (2006.01)
*C10B 53/07* (2006.01)

(52) U.S. Cl.
CPC .............. *C10B 53/07* (2013.01); *C10G 45/06* (2013.01); *C10G 2300/1003* (2013.01); *C10G 2300/1011* (2013.01); *C10G 2300/4006* (2013.01); *C10G 2300/42* (2013.01)

(58) Field of Classification Search
CPC ... C10G 3/48; C10G 3/50; C10G 1/06; C10G 1/002; C10G 1/086; C10G 1/10; C10G 2300/1003; C10G 2300/1014; C10G 3/45; C10G 3/47; C10G 3/52; C10G 2300/1011; C10G 2300/202; C10G 3/42; C10G 3/46; B01J 21/063; B01J 21/066; B01J 23/44; B01J 23/462; B01J 23/464; B01J 23/52; B01J 23/6484; B01J 23/682; B01J 23/882; B01J 23/883; B01J 23/8877; B01J 23/888; B01J 37/20; C10L 1/02; C10L 1/04

See application file for complete search history.

(56) References Cited

U.S. PATENT DOCUMENTS

| | | |
|---|---|---|
| 8,748,680 B2 | 6/2014 | Shell |
| 9,068,126 B2 | 6/2015 | Baird et al. |
| 2015/0175896 A1* | 6/2015 | Traynor .................. C10G 3/48 585/469 |
| 2017/0114283 A1* | 4/2017 | Urade .................... C10K 1/002 |
| 2017/0130134 A1 | 5/2017 | Urade et al. |

FOREIGN PATENT DOCUMENTS

WO 2012166402 A2 12/2012

* cited by examiner

*Primary Examiner* — Sharon Pregler
(74) *Attorney, Agent, or Firm* — Paschall & Associates, LLC; James C. Paschall

(57) ABSTRACT

A process for deoxygenating a pyrolysis oil stream comprises purposely limiting complete deoxygenation of the pyrolysis oil stream having a high oxygenate concentration to provide a hydrotreated pyrolysis oil stream that is sufficiently reduced in oxygenate content to mix with oil. By not fully deoxygenating the pyrolysis oil stream, the deoxygenation reaction can be run with little risk of undesirable polymerization reactions plugging the reactor.

20 Claims, No Drawings

PROCESS FOR PRODUCING FUELS FROM PYROLYSIS OIL

FIELD

The field relates generally to processes for producing fuel pyrolysis oil, and more particularly to processes for producing fuel from the catalytic deoxygenation of pyrolysis oil which may be derived from biomass.

BACKGROUND

Fast pyrolysis is a process during which organic carbonaceous biomass feedstock, i.e., "biomass", such as wood waste, agricultural waste, algae, etc., is rapidly heated to between about 300° C. to about 900° C. in the absence of air using a pyrolysis reactor. Under these conditions, solid products, liquid products, and gaseous pyrolysis products are produced. A condensable portion of the gaseous pyrolysis products is condensed into biomass-derived pyrolysis oil. Biomass-derived pyrolysis oil can be burned directly as fuel for certain boiler and furnace applications and can also serve as a potential feedstock in catalytic processes for the production of fuels in petroleum refineries. Biomass-derived pyrolysis oil has the potential to replace up to 60% of transportation fuels, thereby reducing the dependency on conventional petroleum and reducing its environmental impact.

Biomass-derived pyrolysis oil is a complex, highly oxygenated organic liquid having properties that currently limit its utilization as a biofuel. For example, biomass-derived pyrolysis oil has high acidity and a low energy density attributable in large part to oxygenated hydrocarbons in the oil, which undergo secondary reactions during storage. "Hydrocarbons" as used herein are organic compounds that contain principally only hydrogen and carbon; i.e., oxygen-free. "Oxygenated hydrocarbons" as used herein are organic compounds containing hydrogen, carbon, and oxygen. Exemplary oxygenated hydrocarbons in biomass-derived pyrolysis oil include alcohols such as phenols and cresols, carboxylic acids, alcohols, aldehydes, etc. Conventional biomass-derived pyrolysis oil comprises at least about 25% and typically at least about 30% by weight oxygen from these oxygenated hydrocarbons. Conversion of biomass-derived pyrolysis oil into biofuels and chemicals requires deoxygenation of the biomass-derived pyrolysis oil. Such deoxygenation may proceed via two main routes, namely the production of either water or carbon dioxide. Reduction of oxygenates in the pyrolysis oil is also necessary for blending with conventional oil fuel stocks.

Unfortunately, deoxygenating biomass-derived pyrolysis oil leads to rapid plugging or fouling of the processing catalyst in a hydroprocessing reactor caused by the formation of solids from the biomass-derived pyrolysis oil. Components in the pyrolysis oil form on the processing catalysts causing catalytic bed fouling, reducing activity of the catalyst and causing build up in the hydroprocessing reactor. Without being bound, it is believed that this plugging is due to an acid catalyzed polymerization of the various components of the biomass-derived pyrolysis oil that create either a glassy brown polymer or powdery brown char, which limit run duration and processability of the biomass-derived pyrolysis oil.

Accordingly, it is desirable to provide methods and catalysts for reducing oxygen content in biomass-derived pyrolysis oils. In addition, it is also desirable to reduce oxygen content in biomass-derived pyrolysis oils without plugging of the catalyst contained in a reactor, thereby increasing run duration and improving processability of the biomass-derived pyrolysis oil. Furthermore, other desirable features and characteristics of the present invention will become apparent from the subsequent detailed description of the invention and the appended claims, taken in conjunction with the accompanying drawings and this background of the invention.

SUMMARY OF THE INVENTION

A process for deoxygenating a pyrolysis oil comprises purposely avoiding complete deoxygenation of the pyrolysis oil stream having a high oxygenate concentration to provide a hydrotreated pyrolysis oil stream that is sufficiently reduced in oxygenate content to mix with oil. By not fully deoxygenating the pyrolysis oil stream, the deoxygenation reaction can be run with little risk of undesirable polymerization reactions plugging the reactor.

DETAILED DESCRIPTION

Various embodiments contemplated herein relate to processes for deoxygenating a pyrolysis oil which is preferably derived from a biomass. However, the pyrolysis oil may be derived from conventional hydrocarbon feedstocks.

The pyrolysis oil may be obtained by thermal decomposition of biomass. Pyrolysis oil is a renewable feedstock that may be produced from the rapid thermal pyrolysis of a lignocellulosic biomass, in the absence of oxygen, to produce liquid product that can be further refined for renewable fuels and chemicals production. Major hurdles to effective utilization of pyrolysis oil are the high oxygen content making it immiscible with petroleum feeds, and the highly reactive nature of certain compounds in the pyrolysis oil causing polymerization and increasing the viscosity of the pyrolysis oil to the point where it solidifies. In order to overcome these difficulties a stabilization process involving catalytic hydrotreating can be performed to partially deoxygenate the pyrolysis oil, and modify the reactive species to prevent polymerization.

Virtually any form of biomass can be used for pyrolysis to produce a biomass-derived pyrolysis oil. The biomass-derived pyrolysis oil may be derived from biomass material, such as, wood, agricultural waste, nuts and seeds, algae, forestry residues, and the like. The biomass-derived pyrolysis oil may be obtained by different modes of pyrolysis, such as, for example, fast pyrolysis, vacuum pyrolysis, catalytic pyrolysis, and slow pyrolysis or carbonization, and the like. Preferably, the pyrolysis is in the absence of hydrogen, but hydrogen may be present such as in hydropyrolysis. The biomass is rapidly heated to between about 300° C. to about 900° C. in the absence of air in a pyrolysis reactor. Pyrolysis pressure may range from between about 0 to about 20 MPa, suitably about 70 kPa to about 6.9 MPa and preferably about 83 to about 138 kPa. Under these conditions, solid products, liquid products, and gaseous pyrolysis products are produced. Gaseous pyrolysis products are collected and condensed into a pyrolysis oil stream. Non-condensable gases and solids may be subjected to further processing.

The composition of the biomass-derived pyrolysis oil can vary considerably and depends on the feedstock and processing variables. Examples of biomass-derived pyrolysis oil "as-produced" can contain up to about 1000 to about 2000 ppm total metals, about 20 to about 33 wt % water, can have high acidity; e.g., total acid number (TAN)>150, and a solids content of about 0.1 wt. % to about 5 wt. %.

The biomass-derived pyrolysis oil may be untreated; e.g., "as produced". However, if needed the biomass-derived pyrolysis oil can be selectively pretreated to reduce any or all of the above properties to a desired level before deoxygenation. Pretreatment processes for biomass-derived pyrolysis oil may include any or all of filtration, ion exchange, fractionation and esterification as described in US 2015/0175896 A1.

Unlike the prior art, the exemplary embodiments taught herein produce a low-oxygen biomass-derived pyrolysis oil by contacting the biomass-derived pyrolysis oil with a deoxygenating catalyst in the presence of hydrogen at predetermined hydroprocessing conditions. Hydroprocessing conditions are selected to ensure adequate deoxygenation of the pyrolysis oil without excessive deoxygenation that can cause polymerization of components in the pyrolysis oil.

The pyrolysis oil feed stream fed to the deoxygenation reactor may have an atomic oxygen concentration of at least about 25 wt % and preferably at least about 30 wt %. The oxygen concentration of the pyrolysis oil feed stream may be no more than about 50 wt %.

A hydrogen stream may be added to the pyrolysis oil feed stream before entry into or in the deoxygenation reactor. Hydrogen should be added at a rate to achieve about 169 to about 2528 $Nm^3/m^3$ of oil (1000 to about 15000 SCF/bbl of oil) and a pressure of about 3.2 MPa (gauge) (450 psig) to about 12.4 MPa (gauge) (1800 psig) and an LHSV of about 0.25 to about 1.5 $hr^{-1}$. It is important that deoxygenation occur without incurring polymerization of polymerizable species in the pyrolysis oil. We have found that by conducting the deoxygenation reaction at a temperature of about 200 to about 340° C., preferably between about 250 and about 325° C., sufficient deoxygenation of hydrocarbon oxygenates is achieved without incurring polymerization that could cause plugging of the reactor.

The biomass-derived pyrolysis oil contained in the feed stream contacts the deoxygenation catalyst at deoxygenation conditions in the presence of hydrogen to convert at least a portion of the oxygenated hydrocarbons in the biomass-derived pyrolysis oil into hydrocarbons. In particular, hydrogen from the hydrogen-containing gas removes oxygen from the biomass-derived pyrolysis oil as water, or as carbon dioxide, thereby reducing the oxygenated hydrocarbon content in the biomass-derived pyrolysis oil effluent.

Under these conditions, complete deoxygenation does not occur in the deoxygenation reactor. Hydrotreating the pyrolysis oil stream in the presence of a hydrogen stream and a hydrotreating catalyst is operated to partially deoxygenate the pyrolysis oil stream to provide a hydrotreated pyrolysis oil stream comprising an atomic oxygen concentration of between about 5 and about 20 wt %. Preferably, the atomic oxygen concentration is greater than 5 wt % and no more than about 20 wt %. In an aspect, the hydrotreated pyrolysis oil stream comprises an atomic oxygen concentration of no more than about 15 wt %, suitably no more than about 12 wt %, preferably no more than about 10 wt % and most preferably no more than about 8 wt % and greater than 5 wt %. The hydrotreated pyrolysis oil stream may comprise an atomic oxygen concentration of about 8 to about 15 wt %. The hydrotreated pyrolysis oil stream preferably has a density of between about 0.91 and about 1.03 $g/cm^3$.

The deoxygenation reactor may be, for example, a batch reactor or a continuous flow reactor, such as, an upflow or downflow tubular reactor with or without a fixed catalyst bed, a continuously stirred reactor, and the like. Other reactors known to those skilled in the art for catalytic hydroprocessing of an oil-based feedstock may also be used.

A hydrotreated effluent stream is discharged from the deoxygenation reactor and may be subjected to cooling and/or vapor-liquid separation to provide the hydrotreated pyrolysis oil stream and a hydrotreated vapor stream. The hydrotreated vapor stream may be further treated to recover unused hydrogen that can be recovered and or recycled to the deoxygenation reactor.

The hydrotreated pyrolysis oil stream which is just partially deoxygenated surprisingly is highly miscible with a conventional oil stream such that at least 80 vol % of the hydrotreated oil stream is miscible with a conventional oil stream and preferably at least about 90 vol % of the hydrotreated oil stream is miscible with a conventional oil stream. In an aspect, the hydrotreated pyrolysis oil stream is completely miscible with a conventional oil stream.

The deoxygenation catalyst comprises a neutral catalyst support with one or more hydrogenation metals disposed on the support. As used herein, a "neutral catalyst support" is defined as one that exhibits less than 15% total conversion of 1-heptene in a catalytic test reactor as follows: 0.25 g of solid support material, ground and sieved to 40/60 mesh, is loaded in a tubular reactor and heated under an upflowing hydrogen stream at 1 atmosphere to 550° C. for 60 minutes. The reactor is cooled to 425° C., the hydrogen flow rate is set at 1 slm (standard liter per minute), and 1-heptene is introduced to the catalyst bed by injection into or saturation of the hydrogen stream at a rate of about 0.085 g/min. Conversion of 1-heptene is defined by 100*(1-X(heptene)) where X(heptene) is the mole fraction of 1-heptene in the hydrocarbon product as determined by gas chromatographic analysis of the reactor effluent stream. Various options for gas chromatographic analysis as is known in the art may be used, and other analytical methods known in the art may be substituted for gas chromatographic analysis as long as a mole fraction of 1-heptene in the product may be calculated.

The neutral catalyst support may comprise a titanium oxide ($TiO_2$) support, a zirconium oxide ($ZrO_2$) support, a niobium oxide ($Nb_2O_5$) support, a theta alumina support, or combinations thereof. Preferably, the neutral catalyst support may comprise a non-alumina metal. More preferably, the neutral catalyst support comprises a titanium oxide support or a zirconium oxide support. Most preferably the neutral catalyst support comprises titanium oxide which is resistant to chemical erosion from the highly corrosive biomass-derived pyrolysis oil feed stream. The non-alumina metal oxide supports can be mixed with one or more additional components to improve the physical stability and/or phase stability of the metal oxide. Components that improve physical stability include, but are not limited to, carbon, other metal oxides, and clays as known in the art. Components that improve phase stability include, but are not limited to, base metals, transition metals, non-metals, lanthanide metals, and combinations thereof. "Theta alumina" as used herein refers to alumina having a crystallinity as measured by X-ray diffraction corresponding to that characterized in the Joint Committee on Powder Diffraction Standards number 23-1009.

The deoxygenation catalyst also comprises hydrogenation metals disposed on the neutral catalyst support. The metals may be nickel, cobalt, and molybdenum. In an exemplary embodiment, nickel is present in an amount calculated as an oxide of from about 0.1 to about 1.5 wt. %, and preferably from about 0.5 to about 1.0 wt. % of the deoxygenation catalyst. Cobalt is present in an amount calculated as an oxide of from about 2 to about 4 wt %, and preferably about 2.5 to about 3.5 wt % of the first deoxygenating catalyst. Molybdenum is present in an amount calculated as an oxide of from about 10 to about 20 wt %, and preferably about 13 to about 17 wt % of the deoxygenation catalyst. The term "calculated as an oxide" means that the metal is calculated as a metal oxide. When metals are initially incorporated onto the neutral catalyst support, they may be present as a metal oxide, rather than in the metallic state. Therefore, as used herein, if the metal is "calculated as an oxide", the catalyst has x % metal oxide. The actual amount of the metal will be somewhat lower depending on the stoichiometry of a specific oxide. To prepare the catalyst for deoxygenation, the oxide is converted to sulfide by presulfidation leaving the metallic sulfide form of the metal on the neutral catalyst support.

The neutral catalyst support is stable and resistant to dissolving over time in the biomass-derived pyrolysis oil, which typically has a high water content, and therefore provides a robust and durable support for the hydrogenation metals. Moreover, the neutral catalyst support does not promote acid catalyzed polymerization of the various components of the biomass-derived pyrolysis oil that otherwise cause catalyst reactor plugging. Furthermore, the catalytic activity of cobalt-molybdenum, which is relatively low but resistant to polymerization that can lead to catalyst reactor plugging, can be selectively increased with the addition of a small amount of nickel to effectively deoxygenate biomass-derived pyrolysis oil without increasing the catalyst activity to the extent of causing the catalyst to plug. Any of the above lines, units, separators, columns, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring components, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Example

A series of pilot plant studies were undertaken to find appropriate conditions for deoxygenating biomass-derived pyrolysis oil using the titanium supported catalyst in the Description herein. A feed rate of 0.3 to 0.6/hr LHSV and a hydrogen to hydrocarbon ratio of 801 to 1425 $Nm^3/m^3$ (4500 to 8000 SCF/bbl) oil, were found to provide successful outcomes. Reactor pressures in the range of 6.9 to about 13.8 MPa (gauge) (1000-2000 psig) were found to provide a sufficient hydrogen partial pressure to produce sufficient reaction driving force, while allowing a low enough reactor temperature to prevent excessive polymerization and consequent reactor plugging.

One deoxygenation study evaluated temperatures ranging from 200-350° C. at a reactor pressure of 8.3 MPa (gauge) (1200 psig), a hydrogen to hydrocarbon ratio of 1425 $Nm^3/m^3$ and a feed rate of 0.5/hr LHSV. A deoxygenation reaction temperature of 200° C. resulted in a liquid hydrotreated pyrolysis product about 20 wt % oxygen; whereas, a deoxygenation reaction temperature of 325° C. resulted in a liquid hydrotreated pyrolysis product of about 8 wt % oxygen. Deoxygenation reaction temperatures above 350° C. caused reactor plugging and forced shutdown.

Partially deoxygenated pyrolysis oil exhibited complete miscibility with petroleum distillate, petroleum vacuum gas oil (VGO), soybean vegetable oil, and untreated raw pyrolysis oil feed. Two blends of partially deoxygenated pyrolysis oil comprising 8.1 and 9.8 wt % oxygen with diesel having a T5 of 173° C. and a T95 of 364° C., with VGO having a T5 of 235° C. and a T95 of 498° C., and soybean oil were stored at 80° C. for three weeks to demonstrate the stability of the blended products. At the end of three weeks all blends were found to still be homogeneous with no evidence of phase separation, and the viscosities of all the blends were essentially unchanged from the beginning of the stability study.

Specific Embodiments

While the following is described in conjunction with specific embodiments, it will be understood that this description is intended to illustrate and not limit the scope of the preceding description and the appended claims.

A first embodiment of the invention is a process for deoxygenating a pyrolysis oil comprising providing a pyrolysis oil feed stream having an oxygen concentration of at least about 25 wt %; hydrotreating the pyrolysis oil stream in the presence of a hydrogen stream and a hydrotreating catalyst to partially deoxygenate the pyrolysis oil stream to provide a hydrotreated pyrolysis oil stream comprising an oxygen concentration of between about 5 and about 20 wt %. An embodiment of the invention is one, any or all of prior embodiments in this paragraph up through the first embodiment in this paragraph further comprising separating a hydrotreated effluent stream to provide the hydrotreated pyrolysis oil stream and a hydrotreated vapor stream. An embodiment of the invention is one, any or all of prior embodiments in this paragraph up through the first embodiment in this paragraph wherein the hydrotreating step is performed at a reaction temperature of about 200 to about 340° C. An embodiment of the invention is one, any or all of prior embodiments in this paragraph up through the first embodiment in this paragraph wherein the hydrotreated pyrolysis oil stream is miscible with oil. An embodiment of the invention is one, any or all of prior embodiments in this paragraph up through the first embodiment in this paragraph wherein the pyrolysis oil feed stream comprises an oxygen concentration of about 30 to about 50 wt %. An embodiment of the invention is one, any or all of prior embodiments in this paragraph up through the first embodiment in this paragraph wherein the hydrotreated pyrolysis oil stream comprises an oxygen concentration of about 8 to about 15 wt %. An embodiment of the invention is one, any or all of prior embodiments in this paragraph up through the first embodiment in this paragraph further comprising providing the pyrolysis oil feed stream by thermally decomposing a solid biomass material in the absence of hydrogen. An embodiment of the invention is one, any or all of prior embodiments in this paragraph up through the first embodiment in this paragraph further comprising hydrotreating the pyrolysis oil stream without plugging the reactor. An embodiment of the invention is one, any or all of prior embodiments in this paragraph up through the first embodiment in this paragraph wherein the hydrotreating catalyst comprises a neutral catalyst support. An embodiment of the invention is one, any or all of prior embodiments in this paragraph up through the first embodiment in this paragraph wherein the neutral catalyst support comprises a titanium oxide a silicon oxide, a zirconium oxide ($ZrO_2$), a niobium oxide ($Nb_2O_5$), a theta alumina or mixtures thereof. An embodiment of the invention is one, any or all of prior embodiments in this paragraph up through the first embodiment in this paragraph wherein the hydrotreating catalyst comprises metals disposed on the neutral catalyst support comprising nickel, cobalt and/or molybdenum. An embodiment of the invention is one, any or all of prior embodiments in this paragraph up through the first embodiment in this paragraph, further comprising at least one of sensing at least one parameter of the process and generating a signal or data from the sensing; and generating and transmitting the signal or data.

A second embodiment of the invention is a process for deoxygenating a pyrolysis oil comprising providing a pyrolysis oil feed stream having an oxygen concentration of about 30 to about 50 wt %; hydrotreating the pyrolysis oil stream in the presence of a hydrogen stream and a hydrotreating catalyst having a neutral catalyst support to partially deoxygenate the pyrolysis oil stream to provide a hydrotreated effluent stream; and separating a hydrotreated effluent stream to provide a hydrotreated vapor stream and a hydrotreated pyrolysis oil stream comprising an oxygen concentration of between about 5 and about 20 wt %. An embodiment of the invention is one, any or all of prior embodiments in this paragraph up through the second embodiment in this paragraph wherein the hydrotreating step is performed at a reaction temperature of about 200 to about 340° C. An embodiment of the invention is one, any or all of prior embodiments in this paragraph up through the second embodiment in this paragraph wherein the hydrotreated pyrolysis oil stream is miscible with oil. An embodiment of the invention is one, any or all of prior embodiments in this paragraph up through the second embodiment in this paragraph wherein the hydrotreated pyrolysis oil stream comprises an oxygen concentration of about 8 to about 15 wt %. An embodiment of the invention is one, any or all of prior embodiments in this paragraph up through the second embodiment in this paragraph wherein the neutral catalyst support comprises a titanium oxide a silicon oxide, a zirconium oxide ($ZrO_2$), a niobium oxide ($Nb_2O_5$), a theta alumina or mixtures thereof and the hydrotreating catalyst comprises metals disposed on the neutral catalyst support comprising nickel, cobalt and/or molybdenum.

A third embodiment of the invention is a process for deoxygenating a pyrolysis oil comprising providing a pyrolysis oil feed stream having an oxygen concentration of at least about 25 wt %; hydrotreating the pyrolysis oil stream in the presence of a hydrogen stream and a hydrotreating catalyst having a titanium oxide support at a reaction temperature of about 200 to about 340° C. to partially deoxygenate the pyrolysis oil stream to provide a hydrotreated pyrolysis oil stream comprising an oxygen concentration of between about 5 and about 20 wt %. An embodiment of the invention is one, any or all of prior embodiments in this paragraph up through the third embodiment in this paragraph wherein the hydrotreated pyrolysis oil stream comprises an oxygen concentration of about 8 to about 15 wt %. An embodiment of the invention is one, any or all of prior embodiments in this paragraph up through the third embodiment in this paragraph wherein the pyrolysis oil feed stream comprises an oxygen concentration of about 30 to about 50 wt %. An embodiment of the invention is one, any or all of prior embodiments in this paragraph up through the third embodiment in this paragraph wherein the hydrotreating catalyst comprises metals disposed on the support comprising nickel, cobalt and/or molybdenum.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for deoxygenating a pyrolysis oil comprising:
obtaining a pyrolysis oil feed stream by pyrolysis in the absence of hydrogen, said pyrolysis oil feed stream having an oxygen concentration of at least about 25 wt %; and
hydrotreating said pyrolysis oil stream in the presence of a hydrogen stream and a hydrotreating catalyst to partially deoxygenate said pyrolysis oil stream to provide a hydrotreated pyrolysis oil stream comprising an oxygen concentration of greater than 5 wt % and no more than about 20 wt %.

2. The process of claim 1 further comprising separating a hydrotreated effluent stream to provide said hydrotreated pyrolysis oil stream and a hydrotreated vapor stream.

3. The process of claim 1 wherein said hydrotreating step is performed at a reaction temperature of about 200 to about 340° C.

4. The process of claim 1 wherein said hydrotreated pyrolysis oil stream is miscible with oil.

5. The process of claim 1 wherein said pyrolysis oil feed stream comprises an oxygen concentration of about 30 to about 50 wt %.

6. The process of claim 1 wherein said hydrotreated pyrolysis oil stream comprises an oxygen concentration of about 8 to about 15 wt %.

7. The process of claim 1 further comprising providing the pyrolysis oil feed stream by thermally decomposing a solid biomass material in the absence of hydrogen.

8. The process of claim 1 further comprising hydrotreating said pyrolysis oil stream without plugging the reactor.

9. The process of claim 1 wherein said hydrotreating catalyst comprises a neutral catalyst support.

10. The process of claim 9 wherein said neutral catalyst support comprises a titanium oxide a silicon oxide, a zirconium oxide ($ZrO_2$), a niobium oxide ($Nb_2O_5$), a theta alumina or mixtures thereof.

11. The process of claim 9 wherein said hydrotreating catalyst comprises metals disposed on the neutral catalyst support comprising nickel, cobalt and/or molybdenum.

12. The process of claim 1, further comprising at least one of:
sensing at least one parameter of the process and generating a signal or data from the sensing; and
generating and transmitting said signal or data.

13. A process for deoxygenating a pyrolysis oil comprising:
obtaining a pyrolysis oil feed stream by pyrolysis in the absence of hydrogen, said pyrolysis oil feed stream having an oxygen concentration of about 30 to about 50 wt %;
hydrotreating said pyrolysis oil stream in the presence of a hydrogen stream and a hydrotreating catalyst having a neutral catalyst support to partially deoxygenate said pyrolysis oil stream to provide a hydrotreated effluent stream; and
separating the hydrotreated effluent stream to provide a hydrotreated vapor stream and a hydrotreated pyrolysis oil stream comprising an oxygen concentration of greater than 5 wt % and no more than about 20 wt %.

14. The process of claim 13 wherein said hydrotreating step is performed at a reaction temperature of about 200 to about 340° C.

15. The process of claim 13 wherein said hydrotreated pyrolysis oil stream is miscible with oil.

16. The process of claim 13 wherein said hydrotreated pyrolysis oil stream comprises an oxygen concentration of about 8 to about 15 wt %.

17. The process of claim 13 wherein said neutral catalyst support comprises a titanium oxide a silicon oxide, a zirconium oxide ($ZrO_2$), a niobium oxide ($Nb_2O_5$), a theta alumina or mixtures thereof and said hydrotreating catalyst comprises metals disposed on the neutral catalyst support comprising nickel, cobalt and/or molybdenum.

18. A process for deoxygenating a pyrolysis oil comprising:
obtaining a pyrolysis oil feed stream by pyrolysis in the absence of hydrogen, said pyrolysis oil feed stream having an oxygen concentration of at least about 25 wt %; and
hydrotreating said pyrolysis oil stream in the presence of a hydrogen stream and a hydrotreating catalyst having a titanium oxide support at a reaction temperature of about 200 to about 340° C. to partially deoxygenate said pyrolysis oil stream to provide a hydrotreated pyrolysis oil stream comprising an oxygen concentration of greater than 5 wt % and no more than about 20 wt %.

19. The process of claim 18 wherein said hydrotreated pyrolysis oil stream comprises an oxygen concentration of about 8 to about 15 wt %.

20. The process of claim 18 wherein said pyrolysis oil feed stream comprises an oxygen concentration of about 30 to about 50 wt %.

* * * * *